United States Patent [19]
Brambach

[11] Patent Number: 6,036,046
[45] Date of Patent: *Mar. 14, 2000

[54] COLLAPSIBLE CONTAINER

[75] Inventor: Johan Arie Brambach, Leimuiden, Netherlands

[73] Assignee: Euro Maintenance Lease Produktie B.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,569

[22] PCT Filed: Jan. 26, 1996

[86] PCT No.: PCT/NL96/00043

§ 371 Date: Jul. 25, 1997

§ 102(e) Date: Jul. 25, 1997

[87] PCT Pub. No.: WO96/22929

PCT Pub. Date: Aug. 1, 1996

[30] Foreign Application Priority Data

Jan. 27, 1995 [NL] Netherlands ............... 9500149

[51] Int. Cl.[7] .................................. B65D 90/04
[52] U.S. Cl. .................... 220/564; 220/905; 220/666; 220/506; 220/62.19
[58] Field of Search .................... 220/905, 666, 220/DIG. 1, 581, 584, 585, 586, 1.5, 1.6, 564, 495.03, 506, 62.12, 62.22, 495.01, 495.04, 495.05, 495.06, 495.07; 383/3, 109, 113, 907; 190/18 A; 280/78

[56] References Cited

U.S. PATENT DOCUMENTS

| | | | |
|---|---|---|---|
| 2,119,518 | 6/1938 | Boardman | 220/562 |
| 3,589,506 | 6/1971 | Hitchin et al. | 220/62.12 |
| 3,851,786 | 12/1974 | Kaempen | 220/414 |
| 3,965,953 | 6/1976 | Becker et al. | 220/62.12 |
| 3,978,901 | 9/1976 | Jones . | |
| 4,721,397 | 1/1988 | Knutar | 383/109 |
| 5,176,251 | 1/1993 | Davis et al. | 383/113 |
| 5,302,029 | 4/1994 | Weber et al. | 220/495.03 |
| 5,447,110 | 9/1995 | Brown | 220/666 |

FOREIGN PATENT DOCUMENTS

| | | |
|---|---|---|
| 3452444 | 6/1987 | Germany . |
| 1043850 | 9/1966 | United Kingdom . |
| 8001639 | 8/1980 | WIPO ................. 190/18 A |

*Primary Examiner*—Stephen Castellano
*Attorney, Agent, or Firm*—MacMillan, Sobanski & Todd, LLC

[57] ABSTRACT

A container for fluids comprises an outer casing of flexible, pressure resistant material, a gas tight inner casing of flexible material lying inside of the outer casing and being separated therefrom, and a filling connection for filling the inner casing. As a result, the container is collapsible so that filling the container may take place from the collapsed condition and filling is therefore possible without pressure difference while the fluid does not enter an empty space. The egress of gas from the fluid is substantially reduced.

15 Claims, 3 Drawing Sheets

006,036,046

COLLAPSIBLE CONTAINER

BACKGROUND OF THE INVENTION

The invention relates to a container for fluids, in particular gas containing fluids, as well as to use of such container and to an accessory intended for transporting the container.

Containers for liquids are known in various embodiments. The prior art containers have the disadvantage, in particular when they are used for fluids containing gas, such as for example beer or other carbonated fluids, that during filling of the container there must be a difference in pressure between the interior of the container and the fluid supply reservoir. Moreover, at the start of the filling procedure, the fluid enters a substantially empty volume. As a result thereof, a part of the gas contained in the fluid may easily egress which causes a degradation of quality. Furthermore, the prior art container has the drawback that also during discharge of a quantity of fluid gas may easily egress in the empty space within the container which progressively increases in volume. The prior art containers, such as for example a beer cask, also have the drawback that the empty container occupies a lot of space.

BRIEF SUMMARY OF THE INVENTION

The object of the invention is to provide a container as mentioned in the background section, in which these drawbacks are removed in a simple but effective manner.

For this purpose, the container according to the invention is characterized by an outer casing of flexible, pressure resistant material, at least a gas and/or fluid tight inner casing of flexible material lying inside the outer casing and being separated therefrom, and at least a filling connection for filling the inner casing.

In this manner it is accomplished that the container is collapsible so that filling of the inner casing of the container may take place starting from a collapsed condition of at least the inner casing whereby it is possible to fill without pressure difference and whereby the fluid does not enter an empty volume. An egress of gas from the fluid is substantially diminished as a result thereof. When fluid is discharged from the container, at least the volume of the inner casing is permitted to decrease by collapsing, so that also during the use of the fluid gas is not allow to egress. Consequently, the quality of the fluid is maintained, both during filling of the inner casing with fluid and during discharge of fluid from the inner casing. When the container is completely empty, it occupies only little room if the outer casing is collapsible in a more or less flat manner, which is very favorable for transport and storage.

Preferably, the inner casing is removably arranged in the outer casing. As a result, the inner casing may easily be replaced. Furthermore, it is made possible to place inner casings which are suited for different fluids into the same outer casing.

According to a favorable embodiment, the outer casing is gas and/or fluid tight and a second filling connection may be arranged for filling the space between the inner and outer casings. Consequently, the container according to the invention is very suited for transporting dangerous fluids, such as for example hydrogen gas. In that case, the space between the inner and outer casings may be filled with helium so that, in case of a calamity during which the inner casing becomes defective, hydrogen gas and helium are permitted to mix thereby yielding an innocent mixture.

It is an advantage if the outer casing is of circular shaped cross-section and comprises coupling means for coupling the container with an accessory for rolling transport of the container, in which the axis of the coupling means coincide with the center line of the circular shaped cross-section. This makes the transport of full containers relatively easy.

The invention will hereafter be further explained with reference to the drawing very schematically showing an embodiment of the container according to the invention by way of example.

DETAILED DESCRIPTION OF THE INVENTION

Figure 1:
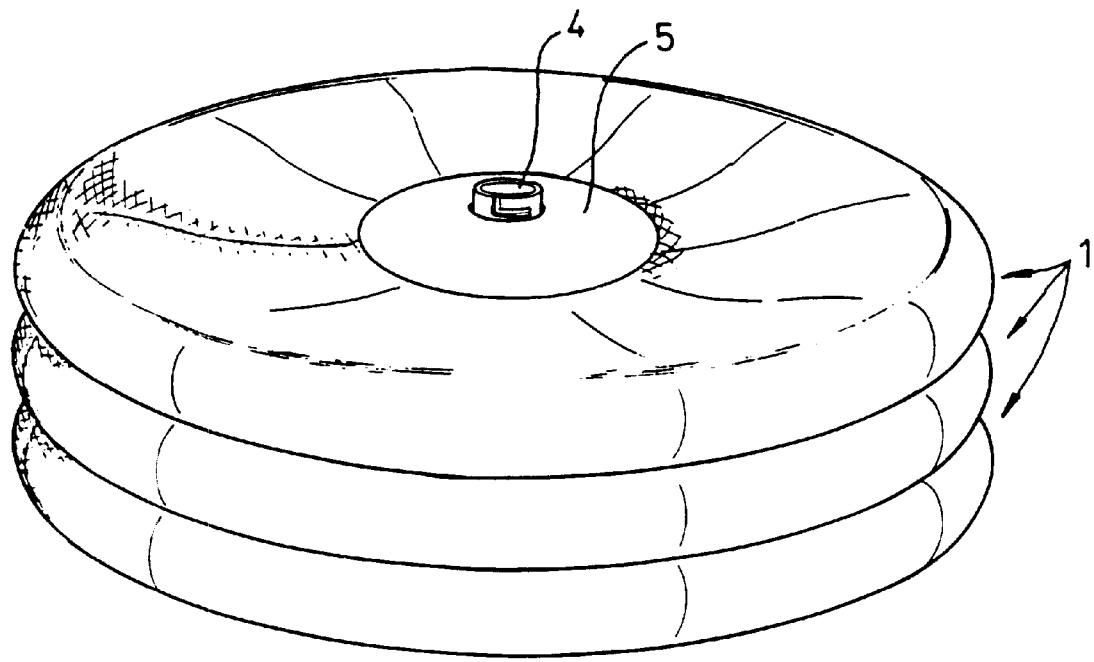
FIG. 1 shows in a perspective view some stacked and collapsed containers according to an embodiment of the invention.

FIG. 1 shows three containers 1 for fluids, in particular fluids containing gas in collapsed and stacked condition. Each container 1 comprises an outer casing 2 of flexible, pressure resistant material and a gas and/or fluid tight inner casing 3 of flexible material, said inner casing 3 being arranged within the outer casing 2 in a loose manner (see FIG. 2). The outer casing 2 may for example be made of fiber reinforced elastomeric material. As a result, the outer casing is deformable but hardly elastic. A casing made in this manner is described for example in EP-A-0 626 338, the disclosure of which is hereby incorporated by reference, and reference is made to this document for further explanations.

Figure 2:
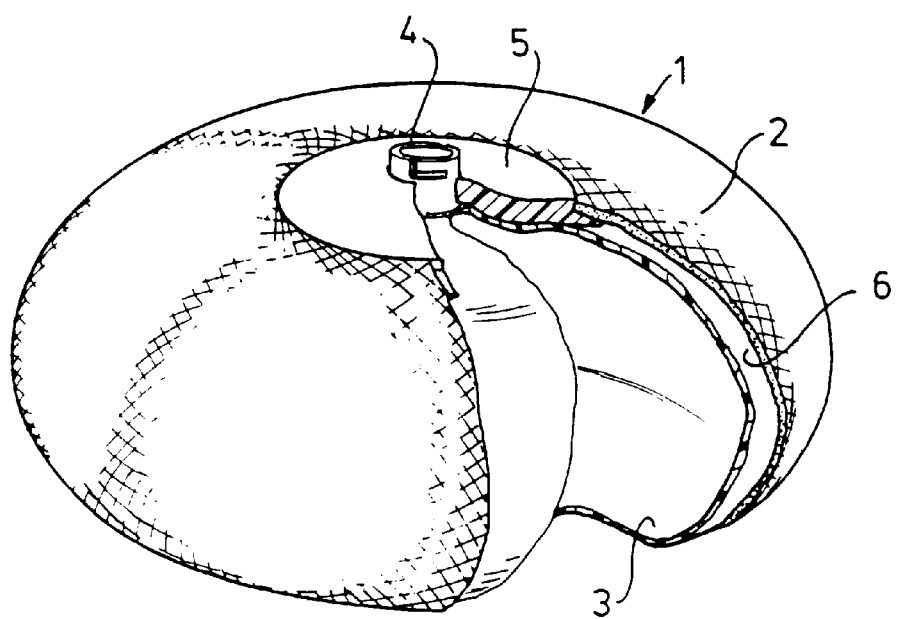
FIG. 2 shows in a perspective and partially exploded view a container of FIG. 1 in filled condition.

In the examplary embodiment as shown, the container 1 comprises a filling/tapping connection 4 which may be constructed in any suited manner. In one preferred embodiment, the filling connection 4 is formed with a wall defining at least one L-shaped channel therein, as shown in FIGS. 1 and 2. This filling connection provides entry to the interior of the inner casing 3.

If required, it is possible to provide more than one inner casing 3 within the outer casing 2, so that several compartments are present in the container 1. In this case, one filling connection is provided for each inner casing 3, said filling connections may be integrated into a single connection element.

In the examplary embodiment shown, the container 1 is of an elliptical longitudinal section and in circular cross-section, when in filled condition. Due to this shape the container is easily collapsible in a flat manner in a direction parallel to the short axis of the ellipse, but not in a direction parallel to the long axis. In the pole positions of the outer casing 2 there are openings which are closed by a closure insert 5 only one of which is visible in the drawing. This closure insert 5 includes a passage opening for the filling connection 4. It is, of course, possible to construct the outer casing in another way.

The inner casing 3 may be inserted into and removed from the outer casing 2 through one of the openings in the outer casing 2. As a result, the inner casing 3 can easily be demounted, for example for cleaning purposes or in case of a defect. It is also possible to use different types of inner casings for different uses.

Figure 4:
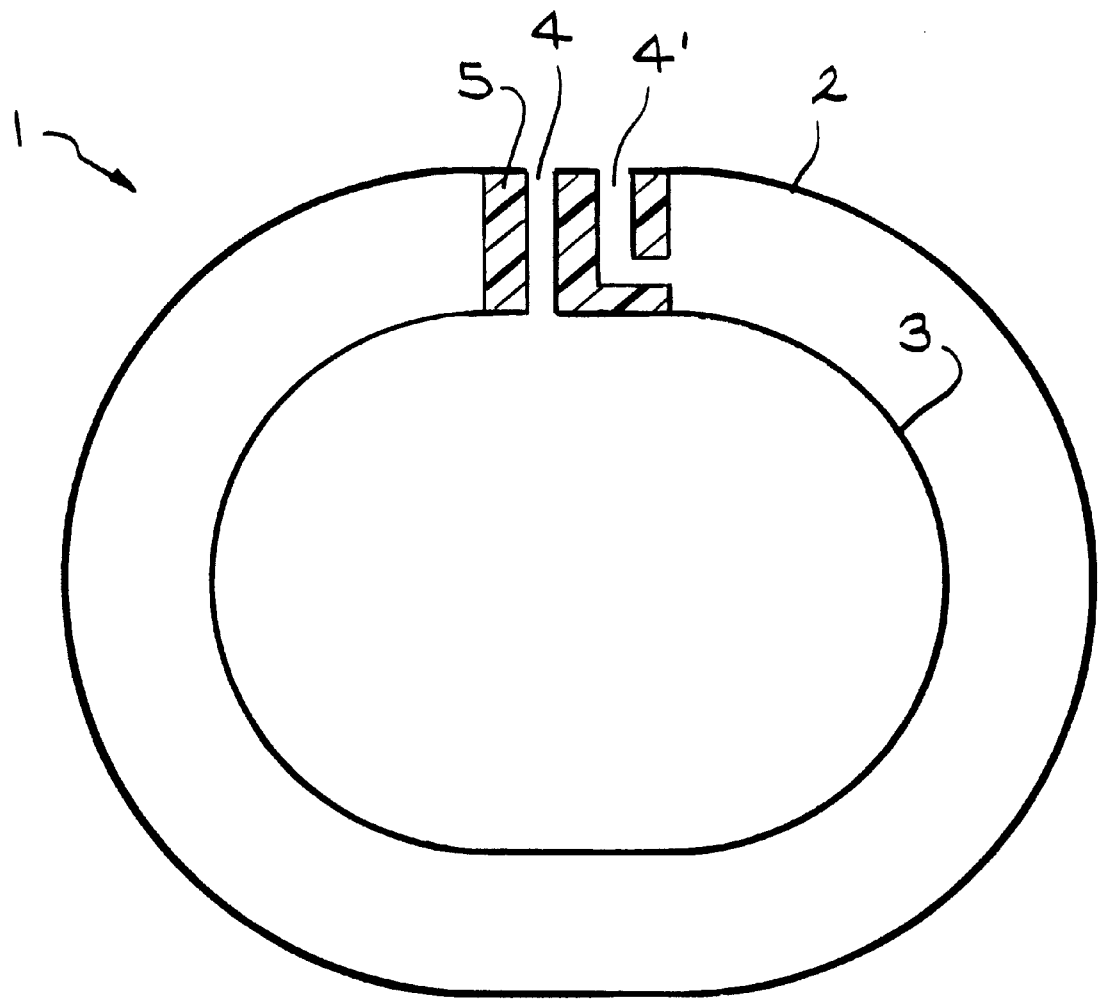
FIG. 4 is a schematic illustration of an alternate embodiment of the invention.

In an alternative embodiment, the outer casing may be completely gas and/or fluid tight, the closure inserts 5 may be sealingly connected to the outer casing and the filling connection 4 may be sealingly mounted within the closure insert 5. In such an embodiment shown in FIG. 4, a second filling connection 4' may preferably be provided in a closure insert 5, said second filling connection providing an entry into the space between the inner casing 3 and the outer casing 2. Both filling connections may be integrated into one connecting element. In such an embodiment, a second fluid may be contained in the space between the inner casing 3 and the outer casing 2.

Such an embodiment of the container as described is very suited for the transport of dangerous fluids, for example hydrogen gas. The hydrogen gas is then contained in the inner casing 3, for example, wherein the space 6 between the inner casing 3 and the outer casing 2 is filled with helium. In case of a calamity in which the inner casing 3 becomes defective the hydrogen gas will mix with the helium thereby yielding a harmless mixture.

In this embodiment of the container it is further possible to fill the inner casing 3 of the container under pressure, that is the inner casing 3 is empty and consequently collapsed and the space between the inner casing 3 and the outer casing 2 is filled/under pressure.

The container 1 as described offers the important advantage that it is not required to have a pressure difference between the interior of the container 1 and the supply reservoir of the fluid during the filling operation and the fluid does not enter a big empty space. As a result gas will not egress from the fluid containing gas during the filling operation so that the quality of the fluid does not deteriorate. Moreover, when the fluid is used and discharged from the container, the volume of the container 1 can be adapted to the remaining amount of fluid so that also during this use gas cannot egress from the fluid. As a result, the storage life of the fluid keeping its constant quality is substantially extended. The container as described is hence very suited as a beer cask. The quality of the beer remains at a constant high level both during filling and during tapping of the beer from the container.

For filling the container 1 and discharging liquid or gas from the container 1, respectively, one may use accessories which are known per se or which are specially adapted.

Figure 3:
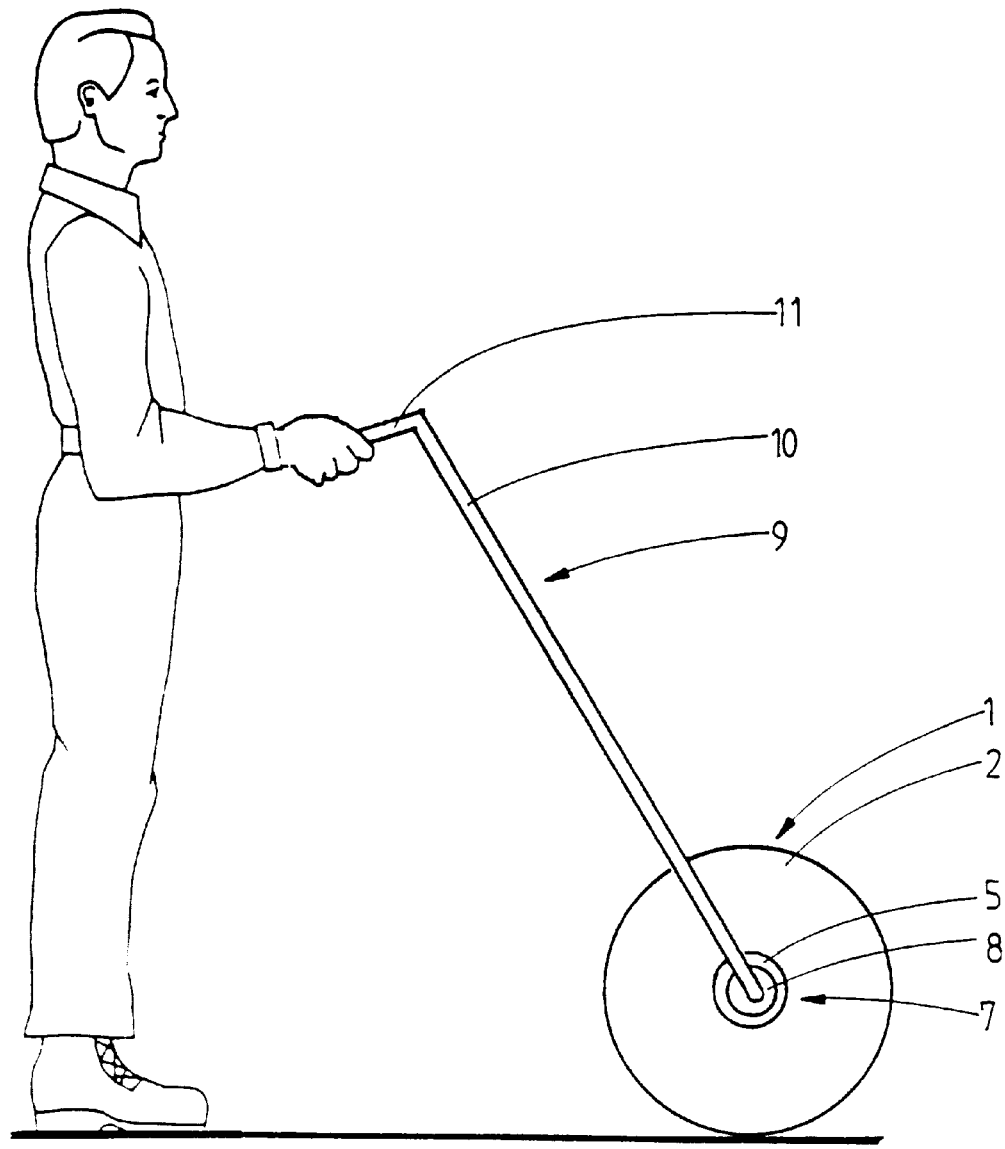
FIG. 3 illustrates in perspective view the use of a container according to the invention together with an accessory for the rolling transport thereof.

FIG. 3 shows that the outer casing 2 of the container 1 is provided in one of its pole positions with coupling means 7 for coupling the container 1 to a coupling member 8 of an accessory 9 for the rolling transport of the container. The coupling should be such that the axis thereof coincides with the center line of the circular cross-section of the container, so that the coupling may serve as a rotary axis of the container 1. In this case, the accessory 9 is provided with a pulling or pushing rod 10 at the free end of which there is formed a handgrip 11. In order to transport a full container 1, it is positioned upright like a wheel with the accessory coupled thereto, whereafter a user may pull or push the container through the handgrip 11 to the desired location. The transport of the container is thus relatively easy. It is also possible to have it towed, for example behind a vehicle, by means of a suitable accessory including a connection member in the position of the handgrip. In this manner and in particular situations a vehicle may carry containers which contain fuel for example. It is furthermore conceivable to couple several containers 1 with each other by means of suitable coupling means, so that an assembly of containers is obtained which is transportable in the manner as described.

The coupling means 7 as described may also be used to couple the container 1 with for example a conveyor in a brewery where the container 1 is filled (again). Also on the site of use, the coupling means may be utilized for attachment to the tap installation.

It is further possible to stack containers one on top of the other by using suitable stacking accessories. These stacking accessories may be coupled to a container, for example by means of said coupling means.

It is noted that within the scope of this application the term "fluid" includes a pressurized gas as well. It will further be clear that each filling connection 4 comprises suitable closure means in a usual way.

The invention is not restricted to the embodiments described hereinbefore which may be varied in different manners within the scope of the invention.

I claim:

1. A transport container for fluids, comprising:

an outer casing made from a fiber reinforced elastomeric material having a circular cross-section when the container is full so that the container can be rolled, said outer casing and said container being collapsible in a substantially flat manner when empty;

an inner casing of flexible material which is at least one of gas tight and fluid tight, said inner casing lying inside said outer casing and being separated therefrom; and a filling connection operatively connected to said inner casing for filling said inner casing.

2. The container according to claim 1, wherein the container is collapsible in a direction perpendicular to a circular cross-section thereof when empty.

3. The container according to claim 1, wherein said inner casing is removably arranged in said outer container.

4. The container according to claim 1, wherein said outer casing is at least one of gas tight and fluid tight.

5. The container according to claim 4, wherein said outer casing and said inner casing cooperate to define a first space therebetween, said first space containing a first fluid, said inner casing defining a second space therein, said second space containing a second fluid, said second fluid being a dangerous fluid which yields a harmless mixture when mixed with said first fluid.

6. The container according to claim 1, further including a second filling connection provided for filling a space defined between said inner casing and said outer casing.

7. The container according to claim 1, wherein said outer casing has an opening in at least one position, said opening being closed by a closure insert in which said filling connection is arranged.

8. The container according to claim 7, further including a second filling connection provided for filling a space defined between said inner casing and said outer casing, said second filling connection being arranged in said closure insert.

9. The container according to claim 1, wherein said outer casing includes a coupling for transporting the container.

10. The container according to claim 9, wherein said circular cross-section of said outer casing defines a centerline coinciding with an axis defined by said coupling.

11. The container according to claim 10, further including an accessory for transporting the container, said accessory comprising a coupling member for cooperation with said coupling to permit rotation of said outer casing relative to said coupling member, and a rod for urging said coupling member against said coupling to cause the container to roll along a surface.

12. The container according to claim 11, further including a hand grip formed on said rod.

13. The container according to claim 1, wherein said outer casing is made of a substantially inelastic material.

14. The container according to claim 1, wherein said outer casing, said inner casing, and said filling connection are formed of materials making the container suitable for use as a beer cask.

15. The container according to claim 1, wherein said filling connection has a wall defining an L-shaped channel therein.

* * * * *